United States Patent
Critchley et al.

(10) Patent No.: US 6,971,241 B2
(45) Date of Patent: Dec. 6, 2005

(54) DUAL MODE POWER UNIT HAVING A COMBUSTOR BYPASS SYSTEM

(75) Inventors: Ian L. Critchley, Phoenix, AZ (US); Barry J. Kingery, Glendale, AZ (US); Cristopher Frost, Scottsdale, AZ (US); David G. Walhood, Scottsdale, AZ (US); Robert B. Sumegi, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 10/705,580

(22) Filed: Nov. 10, 2003

(65) Prior Publication Data

US 2005/0097896 A1   May 12, 2005

(51) Int. Cl.[7] .............................................. F02C 7/268
(52) U.S. Cl. .............................. 60/776; 60/787; 60/785
(58) Field of Search ........................ 60/776, 785, 784, 60/39.13, 786, 787, 788

(56) References Cited

U.S. PATENT DOCUMENTS

| | | | |
|---|---|---|---|
| 4,052,845 A | 10/1977 | Tumavicus | |
| 4,569,199 A | 2/1986 | Klees et al. | |
| 4,815,277 A | 3/1989 | Vershure, Jr. et al. | |
| 4,885,909 A | 12/1989 | Rodgers | |
| 4,979,362 A | 12/1990 | Vershure, Jr. | |
| 5,003,773 A | 4/1991 | Beckwith | |
| 5,060,469 A | 10/1991 | Klaass et al. | |
| 5,261,228 A | 11/1993 | Shuba | |
| 5,363,641 A | 11/1994 | Dixon et al. | |
| 5,394,687 A * | 3/1995 | Chen et al. | 60/785 |
| 6,101,806 A | 8/2000 | Chen et al. | |
| 6,334,297 B1 | 1/2002 | Dailey et al. | |
| 6,640,548 B2 * | 11/2003 | Brushwood et al. | 60/776 |

* cited by examiner

*Primary Examiner*—Ehud Gartenberg
(74) *Attorney, Agent, or Firm*—Robert Desmond, Esq.

(57) ABSTRACT

A gas turbine engine integrates the functions of an auxiliary power unit (APU) with one or more functions of an ECS, and that is capable of operating in both an unfired mode and a fired mode. The gas turbine engine includes a combustor system that is configured to allow the gas turbine to quickly transition from the unfired mode to the fired mode, by bypassing a portion of the air flowing to the combustor system around the combustor.

20 Claims, 5 Drawing Sheets

DUAL MODE POWER UNIT HAVING A COMBUSTOR BYPASS SYSTEM

STATEMENT REGARDING FEDERALLY SPONSORED RESEARCH OR DEVELOPMENT

This invention was made with Government support under contract number N00019-02-C-3002, awarded by the U.S. Navy. The Government has certain rights in this invention.

FIELD OF THE INVENTION

The present invention relates to gas turbine engines and, more particularly, to dual-mode gas turbine engine that includes a combustor bypass system.

BACKGROUND OF THE INVENTION

Aircraft main engines not only provide propulsion for the aircraft, but in many instances may also be used to drive various other rotating components such as, for example, generators, compressors, and pumps, to thereby supply electrical, pneumatic, and/or hydraulic power. However, when an aircraft is on the ground, its main engines may not be operating. Moreover, in some instances the main engines may not be capable of supplying power. Thus, many aircraft include one or more auxiliary power units (APUs).

An APU is, in most instances, a gas turbine engine that includes a combustor, a power turbine, and a compressor. During operation of the APU, compressor draws in ambient air, compresses it, and supplies compressed air to the combustor. The combustor receives fuel from a fuel source and the compressed air from the compressor, and supplies high energy compressed air to the power turbine, causing it to rotate. The power turbine includes a shaft that may be used to drive a generator for supplying electrical power, and to drive the compressor.

In addition to supplying electrical, hydraulic, and/or pneumatic power, the main engines may also be used to supply compressed air to the aircraft's environmental control system (ECS). The ECS receives the compressed air from the main engines, and supplies temperature-controlled air to both the aircraft cabin and to electronic equipment within the aircraft. The ECS may also use the compressed air from the main engines to pressurize the aircraft cabin.

In recent years, aircraft system designers have attempted to reduce the number of components and systems, to thereby increase the available onboard space and reduce overall aircraft weight. For example, attempts have been made to integrate APU and ECS functions into a single system. In such systems, the APU may be operable in both a fired mode and an unfired mode. In the fired mode, the APU burns fuel and may be substantially self-powered, similar to a conventional APU. In the unfired mode, the APU receives compressed air from an external compressed air source such as, for example, the main engines, and may use the compressed air to rotate the power turbine and supply electrical power to supplement the main engines.

Although, as noted above, attempts have been made to integrate APU and ECS functions, such integration has not always been successful. This is because such integral systems suffer certain drawbacks. For example, a situation may arise in which the APU is operating in the unfired mode, and it is desired to rapidly transition the APU to the fired mode. For example, the main engine that is supplying the compressed air to the APU may no longer be operable, and shut-off. In such a situation, the airflow through the APU combustor may initially be too high to ignite and/or maintain a stable flame. Thus, a delay period following main engine shut-off may be needed before the APU can ignite and/or maintain a stable flame. This can result in complete or partial loss of electrical, hydraulic, and/or pneumatic power to some systems, as well as complete or partial loss of cooling and/or environmental control air.

Hence, there is a need for an APU that integrates one or more ECS functions and that is capable of quickly transitioning from an unfired mode to a fired mode, and/or that does not result in a complete or partial loss of electrical, hydraulic, and/or pneumatic power during the transition, and/or that does not result in a complete or partial loss of cooling and/or environmental control air during the transition. The present invention addresses one or more of these needs.

SUMMARY OF THE INVENTION

The present invention provides a gas turbine engine that integrates the functions of an APU with one or more functions of an ECS, and that is capable of operating in both an unfired mode and a fired mode. The gas turbine engine includes a combustor system that is configured to allow the gas turbine to quickly transition from the unfired mode to the fired mode.

In one embodiment, and by way of example only, a gas turbine engine includes a compressor having an inlet and a compressed air outlet, a turbine having at least an inlet, and a combustor assembly. The combustor assembly includes a housing, a combustor, a bypass conduit, and a valve. The housing has at least a first air inlet in fluid communication with the compressed air outlet, a second air inlet adapted to receive compressed air from a second compressed air source, and an inlet plenum in fluid communication with the first and second air inlets. The combustor is mounted at least partially within the housing, and has one or more air inlets in fluid communication with the housing inlet plenum, and an outlet in fluid communication with the turbine inlet. The bypass conduit has an inlet, an outlet, and a flow passage therebetween. The bypass conduit inlet is in fluid communication with the housing inlet plenum, and the bypass conduit outlet is in fluid communication with the combustor outlet. The valve is mounted on the bypass conduit and is moveable between an open position, whereby fluid flow through the bypass conduit is allowed, and a closed position, whereby fluid flow through the bypass conduit is prevented.

In another exemplary embodiment, a combustor system includes a housing, a combustor, a bypass conduit, and a valve. The housing has at least a first air inlet adapted to receive compressed air from a first compressed air source, a second air inlet adapted to receive compressed air from a second compressed air source, and an inlet plenum in fluid communication with the first and second air inlets. The combustor is mounted at least partially within the housing, and has one or more air inlets in fluid communication with the housing inlet plenum, and an outlet. The bypass conduit has an inlet, an outlet, and a flow passage therebetween. The bypass conduit inlet is in fluid communication with the housing inlet plenum, and the bypass conduit outlet is in fluid communication with the combustor outlet. The valve is mounted on the bypass conduit and is moveable between an open position, whereby fluid flow through the bypass conduit is allowed, and a closed position, whereby fluid flow through the bypass conduit is prevented.

In yet another exemplary embodiment, an aircraft propulsion system includes a main engine and an auxiliary engine.

The main engine includes a compressor, a combustor, and one or more turbines. The auxiliary engine includes a compressor having an inlet and a compressed air outlet, a turbine having at least an inlet, and a combustor system that includes a housing, a combustor, a bypass conduit, and a valve. The housing has at least a first air inlet in fluid communication with the auxiliary engine compressor air outlet, a second air inlet coupled to receive compressed air from the main engine compressor, and an inlet plenum in fluid communication with the first and second air inlets. The combustor is mounted at least partially within the combustor system housing, and has one or more air inlets in fluid communication with the housing inlet plenum, and an outlet in fluid communication with the auxiliary engine turbine inlet. The bypass conduit has an inlet, an outlet, and a flow passage therebetween. The bypass conduit inlet is in fluid communication with the combustor system housing inlet plenum, and the bypass conduit outlet is in fluid communication with the combustor outlet. The valve is mounted on the bypass conduit and is moveable between an open position, whereby fluid flow through the bypass conduit is allowed, and a closed position, whereby fluid flow through the bypass conduit is prevented.

In yet still another exemplary embodiment, a method of operating a gas turbine engine combustor system having at least a combustor, the method comprising the steps of supplying a flow of compressed air through the combustor. A determination is made as to whether the compressed air flowing through the combustor should be ignited and, if so, a portion of the compressed air flow is bypassed away from the combustor. Fuel is supplied to the combustor, and is ignited therein.

Other independent features and advantages of the preferred gas turbine engine system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of turbine engine. Thus, although the present embodiment is, for convenience of explanation, depicted and described as being implemented in combination with a multi-spool turbofan gas turbine jet engine, it will be appreciated that it can be implemented in various other types of turbines, and in various other systems and environments.

Figure 1:
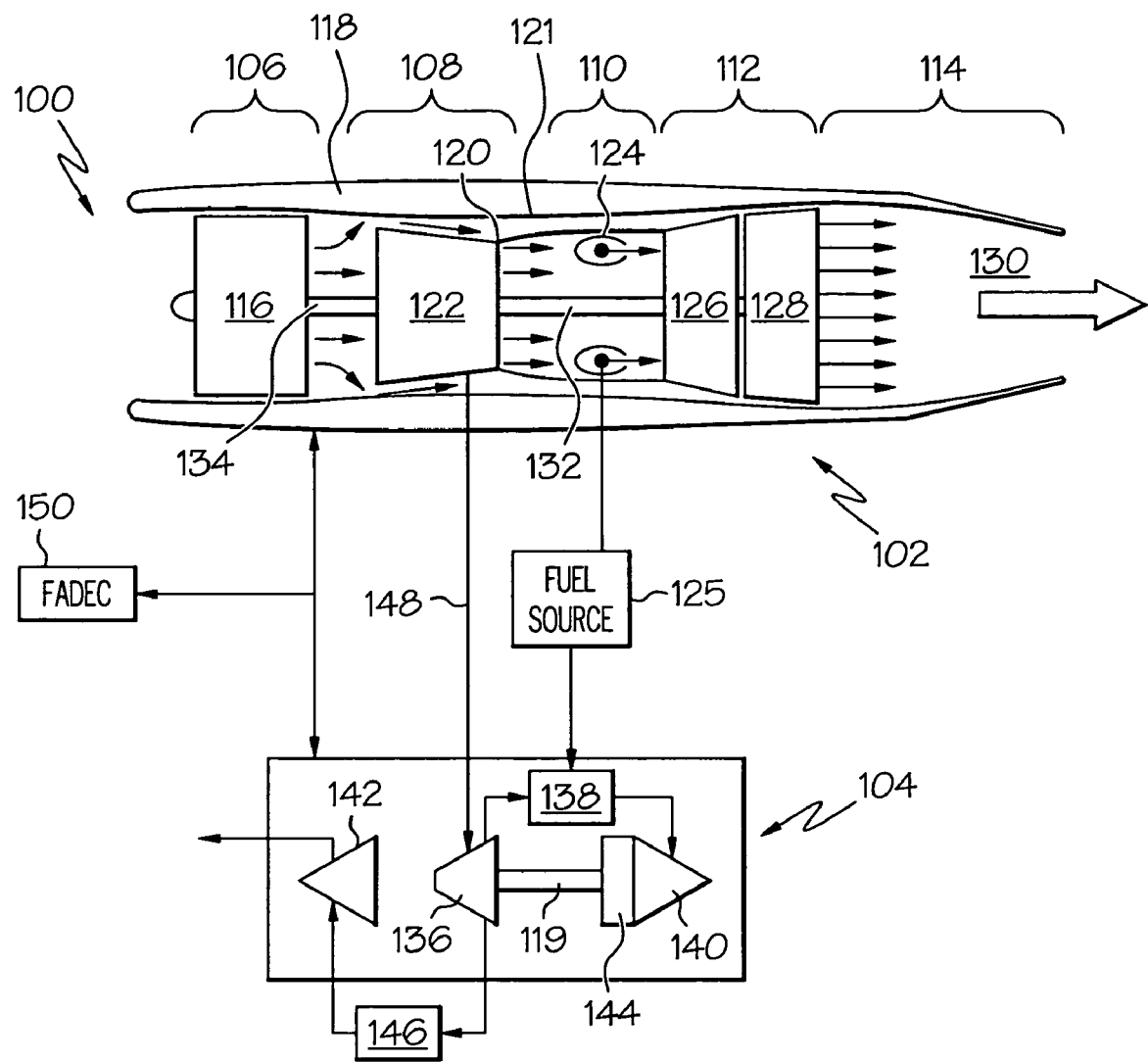
FIG. 1 is a simplified schematic diagram of an exemplary aircraft propulsion system that incorporates an exemplary gas turbine engine embodiment according to the present invention.

Turning now to the description, and with reference first to FIG. 1, an exemplary embodiment of an exemplary propulsion system 100 is shown in simplified schematic form. The system 100 includes a main propulsion engine 102 and a dual-mode auxiliary engine 104. In the depicted embodiment, the main propulsion engine 102 is a multi-spool turbofan gas turbine jet engine, and includes an intake section 106, a compressor section 108, a combustion section 110, a turbine section 112, and an exhaust section 114. The intake section 106 includes a fan 116, which is mounted in a fan case 118. The fan 116 draws air into the intake section 106 and accelerates it. A fraction of the accelerated air exhausted from the fan 116 is directed through a bypass section 120 disposed between the fan case 118 and an engine cowl 121, and provides a forward thrust. The remaining fraction of air exhausted from the fan 116 is directed into the compressor section 108.

The compressor section 108 may include one or more compressors 122, which raise the pressure of the air directed into it from the fan 116, and directs the compressed air into the combustion section 110. In the depicted embodiment, only a single compressor 122 is shown, though it will be appreciated that one or more additional compressors could be used. In the combustion section 110, which includes a combustor assembly 124, the compressed air is mixed with fuel supplied from a fuel source 125. The fuel/air mixture is combusted, and the high energy combusted air is then directed into the turbine section 112.

The turbine section 112 includes one or more turbines. In the depicted embodiment, the turbine section 112 includes two turbines, a high pressure turbine 126, and a low pressure turbine 128. However, it will be appreciated that the engine 100 could be configured with more or less than this number of turbines. No matter the particular number, the combusted air from the combustion section 110 expands through each turbine, causing it to rotate. The air is then exhausted through a propulsion nozzle 130 disposed in the exhaust section 114, providing additional forward thrust. As the turbines 126 and 128 rotate, each drives equipment in the main propulsion engine 102 via concentrically disposed shafts or spools. Specifically, the high pressure turbine 126 drives the compressor 122 via a high pressure spool 132, and the low pressure turbine 128 drives the fan 116 via a low pressure spool 134.

The auxiliary engine 104 includes a compressor 136, a combustor assembly 138, a power turbine 140, and a cooling turbine 142. The auxiliary engine 104 is capable of operating in either a fired mode or an unfired mode. During operation in the fired mode, the auxiliary engine 104 is substantially self-powered. In particular, the compressor 136 draws in ambient air, compresses it, and supplies a portion of the compressed air to the combustor assembly 138. The combustor assembly 138 also receives fuel from the fuel source 125 and supplies high energy combusted air to the power turbine 140, causing it to rotate. The power turbine 140 includes a shaft 119 that drives a generator 144 to supply electrical power, and also drives the compressor 136.

Some of the compressed air supplied by the auxiliary engine compressor 136 is also supplied to one or more heat exchangers 146, which cool and dry the compressed air. The cool, dry compressed air is then supplied to, and expanded through, the cooling turbine 142, which further cools the air. The air from the cooling turbine 142 is then supplied to the aircraft cabin and/or various electrical equipment, such as aircraft avionics equipment, to provide cooling thereof.

During operation in the unfired mode, the auxiliary engine 104 does not burn fuel, and is not self-powered. Rather, compressed air from the main propulsion engine 102 is supplied to the auxiliary engine 104 via a compressed air supply conduit 148. In particular, compressed air from the main propulsion engine compressor 122 flows through the compressed air supply conduit 148, into and through the combustor assembly 138, and into and through the power turbine 140, causing it to rotate. As in the fired mode, the power turbine 140 drives the generator 144, to supply electrical power, and drives the compressor 136, which supplies compressed air to the heat exchangers 146, to thereby supply cool dry compressed air.

As FIG. 1 additionally depicts, the main propulsion engine 102 and the auxiliary engine 104 are each controlled, at least partially, by an engine controller such as, for example, a FADEC (Full Authority Digital Engine Controller) 150. The FADEC 150, as is generally known, receives various commands and sensor signals and, in response to these commands and sensor signals, appropriately controls engine operation. In the depicted embodiment, the FADEC 150 controls the operation of both the main propulsion engine 102 and the auxiliary engine 104. In particular, when the FADEC 150 determines that the main propulsion engine 102 is operating properly, the FADEC 150 controls main propulsion engine 102 normally and controls the auxiliary engine 104 to operate in the unfired mode. Conversely, when the FADEC 150 determines that the main propulsion engine 102 is not operating properly, needs to be shutdown, or has shutdown, the FADEC 150 transitions the auxiliary engine 104 to, and controls the auxiliary engine 104 to operate in, the fired mode.

When the FADEC 150 determines that the main propulsion engine 102 is inoperable or, for some other reason, is not operating properly, the FADEC 150 needs to quickly transition the auxiliary engine 104 to the fired mode before the main propulsion engine 102 ceases its rotation. However, the flow of compressed air from the main propulsion engine 102 through the auxiliary engine combustor assembly 138 is, in many instances, initially too high to either ignite or maintain a stable flame. Thus, the combustor assembly 138 includes a bypass system (not shown in FIG. 1) that selectively bypasses a portion of compressed air away from the section of the combustor assembly 138 in which ignition occurs, thereby creating conditions in this section that are more conducive to flame ignition and stability. With reference now to FIGS. 2–5, the structure and configuration of an exemplary embodiment of the combustor assembly 138 and the bypass system included therein will now be described.

Figure 2:
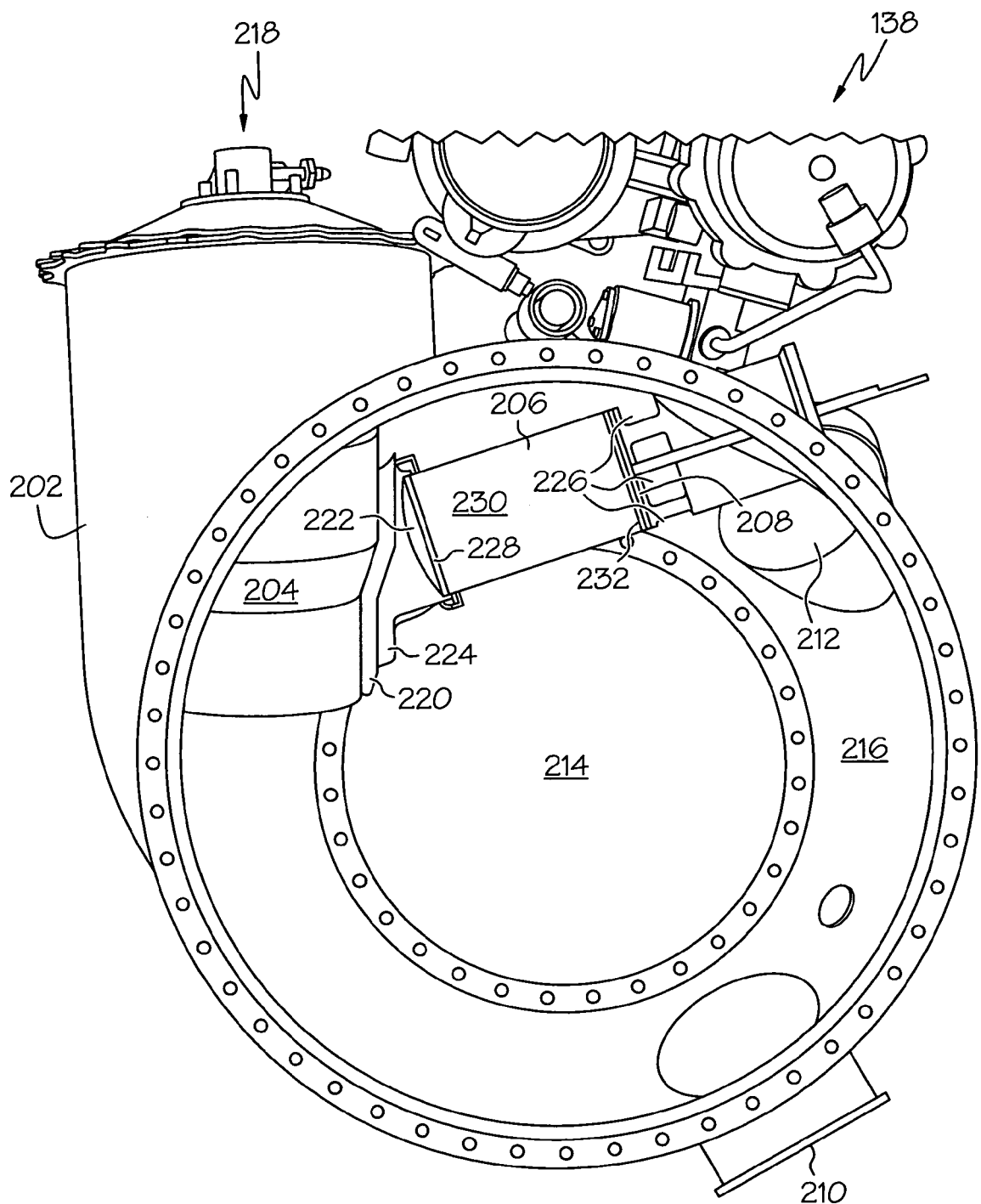
FIG. 2 is partial cross section front view of a combustor assembly according to an exemplary embodiment of the present invention that may be used in the system of FIG. 1.
Figure 3:
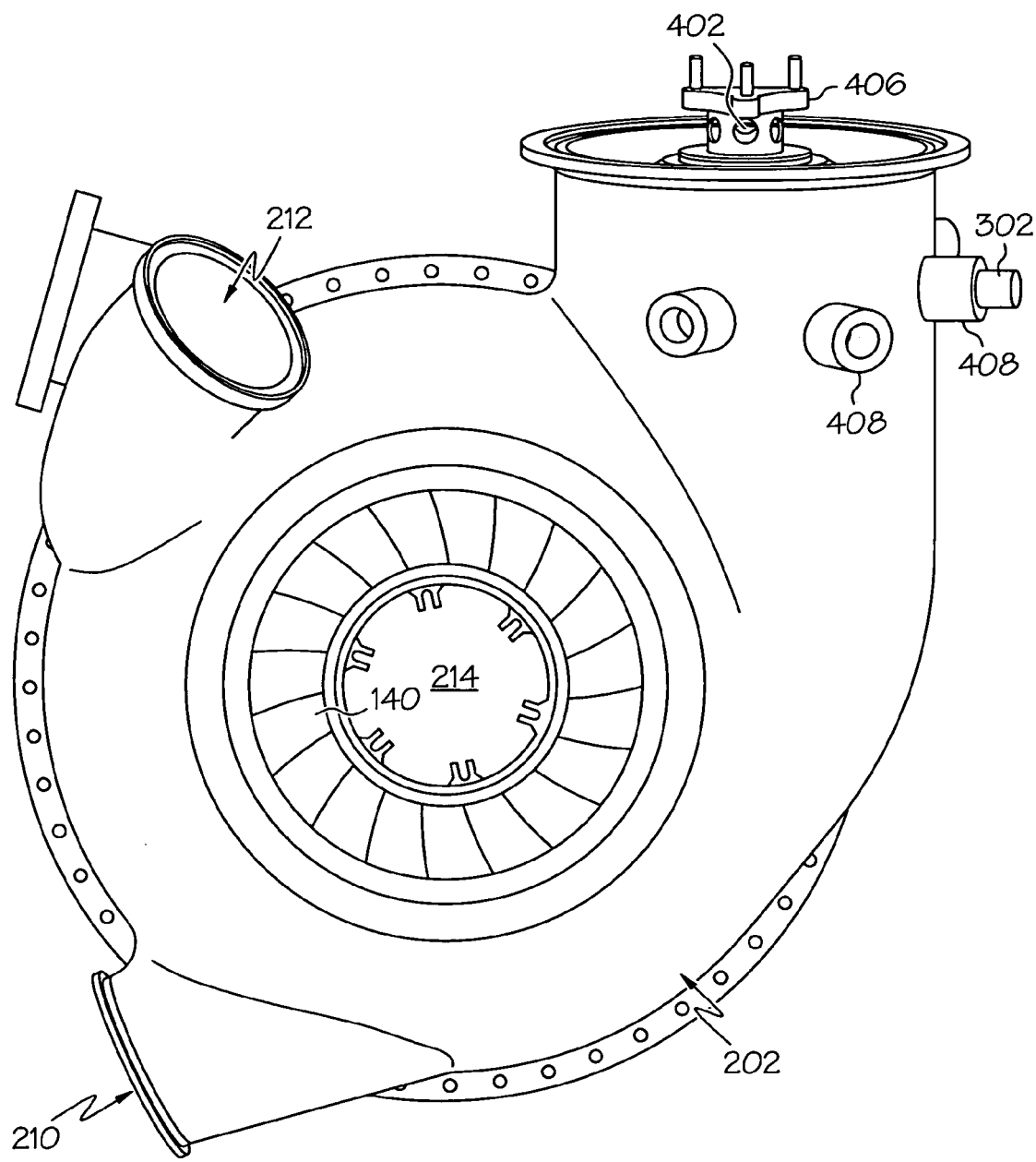
FIG. 3 is a rear view of the combustor assembly of FIG. 2.

The combustor assembly 138, as shown in FIGS. 2 and 3, includes a housing 202, a combustor 204, a bypass conduit 206, and a valve 208. The housing 202 includes two inlets, a first air inlet 210 and a second air inlet 212, and an air outlet 214. The first air inlet 210 is coupled to receive compressed air from the auxiliary engine compressor 136, and the second air inlet 212 is coupled to receive compressed air from the main propulsion engine 102, via the compressed air supply conduit 148. The first 210 and second 212 air inlets extend through the housing 202, and are in fluid communication with one another via an inlet plenum 216 formed in the housing 202. Thus, compressed air that enters either the first 210 or second 212 air inlet flows into the inlet plenum 216. From the inlet plenum 216, the air flows into and through the combustor 204 or, as will be described more fully below, into and through both the combustor 204 and the bypass conduit 206. The air exits the housing 202 via the air outlet 214 and flows into the power turbine 140 (partially shown in FIG. 3).

Figure 4:
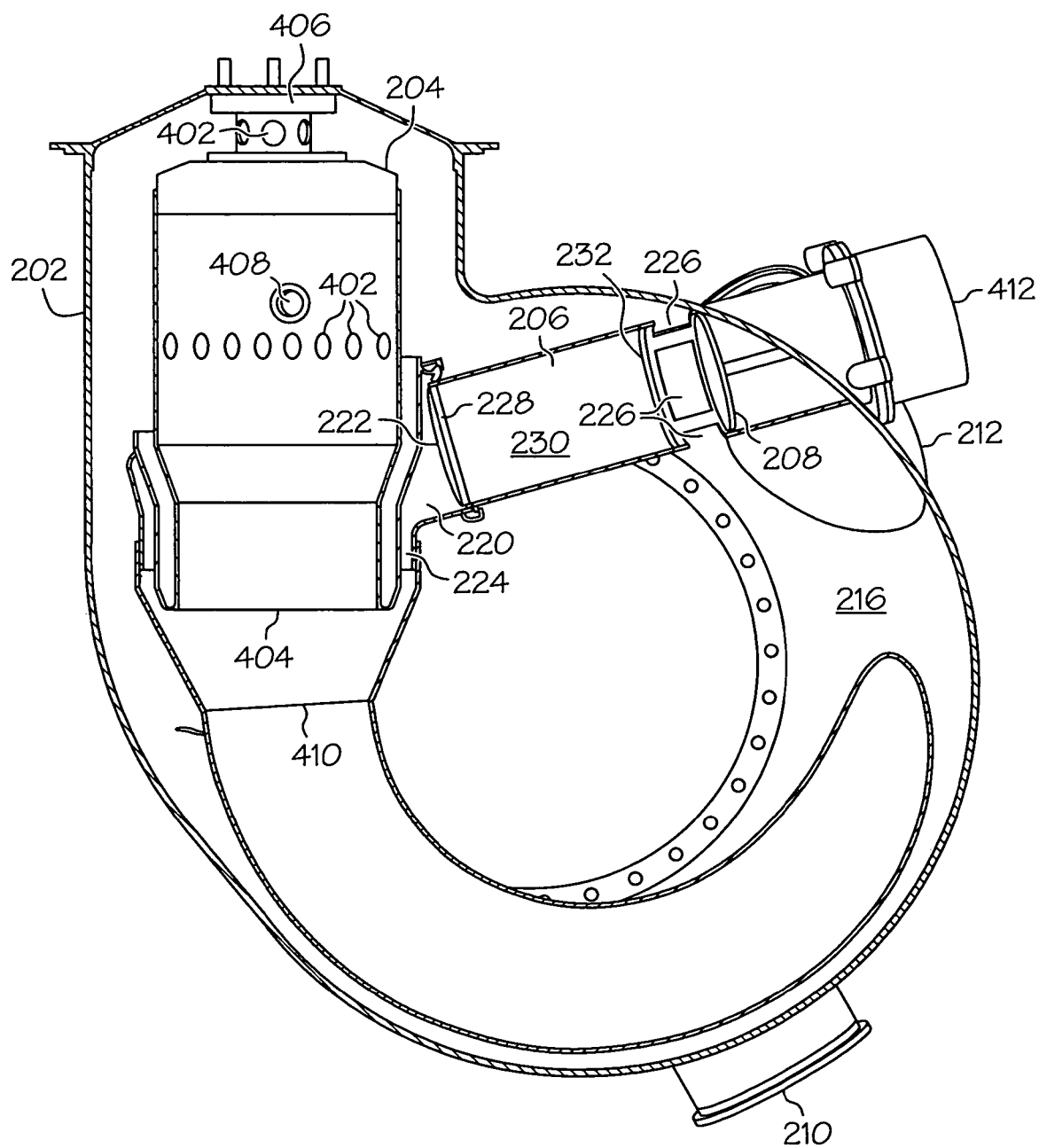
FIGS. 4 and 5 are additional cross section view of the front of the combustor assembly shown in FIG. 2 showing additional and different details of the exemplary combustor assembly.

As shown most clearly in FIG. 4, the combustor 204 is mounted in the housing 202 and includes a plurality of air inlets 402, an outlet 404, a fuel injector mount 406, and a plurality of igniter mounts 408. The air inlets 402, only a portion of which are shown in FIG. 4, are disposed around the sides of the combustor 204, as well as in one of the ends. It will be appreciated that the combustor inlets 402 disposed in the end of the combustor 204 are preferably configured to supply a flow regime that enhances ignition of the fuel that is supplied to the combustor 204. Air that enters the combustor 204 via the air inlets 402 exits the combustor 204 via the outlet 404, and is directed into the power turbine 140. Though not depicted, for clarity sake, it will be appreciated that the combustor 204 may additionally include multiple cooling holes formed partially or completely through the combustor 204, which provide cooling for the combustor 204.

A fuel injector 218 (see FIG. 2) is coupled to the fuel injector mount 406 and is adapted to receive fuel from a non-illustrated fuel source and, in response to commands received from the FADEC 150, the fuel injector 218 injects the fuel supplied to it into the combustor 204. A plurality of igniters 302 (see FIG. 3, in which only one is illustrated) are mounted, one each, in each of the igniter mounts 408. The igniters 302 extend into the combustor 204 and, in response to commands received from the FADEC 150, generate a spark, which ignites the fuel/air mixture in the combustor 204, and maintains the flame once it is ignited.

Figure 5:
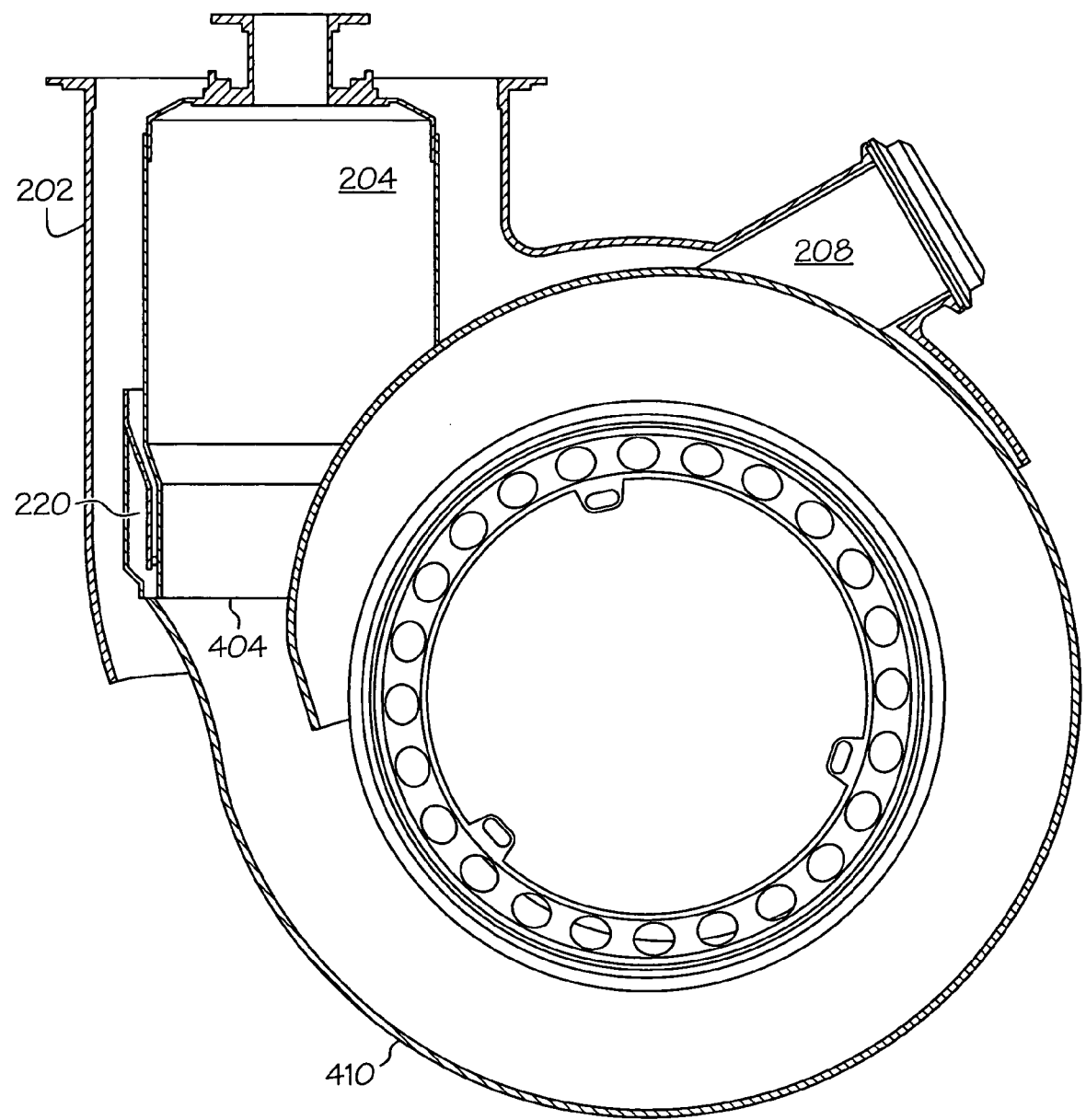

With reference now to FIGS. 4 and 5 in combination, it is seen that the combustor outlet 404 is in fluid communication with the power turbine 140 via a combustion air conduit 410. The combustion air conduit 410, sometimes referred to as a "scroll" because of its substantially spiral shape, directs air that flows out of the combustor outlet 404 into the power turbine 140. As FIGS. 2, 4, and 5 also show, an interface conduit 220 is coupled to, and surrounds, the combustor 204. The interface conduit 220, which includes an inlet port 222 and an outlet port 224 in fluid communication with one another, is used to interface the combustion air conduit 410 to the bypass conduit 206, which will now be described.

The bypass conduit 206, as shown most clearly in FIGS. 2 and 4, is disposed within the combustor assembly housing 202 and includes an inlet 226, an outlet 228, and a flow passage 230 extending between the inlet 226 and outlet 228. The bypass conduit inlet 226, which in the depicted embodiment is implemented as a plurality of openings formed through the bypass conduit 206, is in fluid communication with the housing inlet plenum 216. The bypass conduit outlet 228 is in fluid communication with the combustion air conduit 410 via the interface conduit 220. More particularly, in the depicted embodiment, the bypass conduit 206 extends into, and is coupled to, the interface conduit inlet port 222. Thus, air that enters the bypass conduit inlet 226 flows through the flow passage 230, out the bypass conduit outlet 228, into and through the interface conduit 220, and into and through the combustion air conduit 410, bypassing the combustor 204.

Air flow into and through the bypass conduit 206 is controlled by the valve 208. In particular, if the valve 208 is closed, as shown in FIG. 2, then the valve 208 is seated against a valve seat 232 formed in the bypass conduit 206, and air flow through the bypass conduit 206 is prevented. Conversely, if the valve is open, as shown in FIG. 4, then air flow through the bypass conduit 206 is allowed. The valve 208 may be any one of numerous types of valves known in the art, but in the depicted embodiment, it is a poppet valve. As FIG. 4 also shows, the valve 208 is preferably coupled to an actuator assembly 412. The actuator assembly 412, in response to valve position command signals supplied to it from the FADEC 150 (see FIG. 1), positions the valve 208 into either the open or closed position. It will be appreciated that in a preferred embodiment, the valve 208 and actuator assembly 412 are configured such that the valve 208 is normally shut. That is, if no command signals or power is supplied to the actuator assembly 412, the valve 208 is configured to default to the closed position.

Having described the power and thermal management system 100 and its various components from a structural standpoint, and the overall function of the system 100 and its various components from a general standpoint, a more detailed description of the system function will now be provided. In doing so, reference should be made, as needed, to FIGS. 1–5. Moreover, the following description is predicated on the system 100 being initially configured such that the main propulsion engine 102 is being operated and controlled normally, and thus the auxiliary engine 104 is being operated and controlled in the unfired mode.

With the main propulsion engine 102 operating properly, and the auxiliary engine 104 operating in the unfired mode, air compressed in the main propulsion engine compressor 122 is supplied to the auxiliary engine 104 via the compressed air supply conduit 148. The compressed air from the main propulsion engine 102 flows into and through the auxiliary engine combustor assembly 138, and into and through the power turbine 140, causing it to rotate. As the power turbine 140 rotates, it drives the generator 144, which supplies electrical power. The power turbine 140 also drives the compressor 136, which supplies compressed air to the heat exchangers 146, to thereby supply cool dry compressed air to the cooling turbine 142.

During normal operations, if the FADEC 150 determines that the main propulsion engine 102 is inoperable, or otherwise unable to operate properly, and is shutdown or is shutting down, the FADEC 150 will switch the auxiliary engine 104 to operate in the fired mode. To do so, the FADEC 150 will issue appropriate valve position command signals to the valve actuator assembly 412, causing the valve 208 to move to the open position. When this occurs, some of the air flowing into the combustor assembly housing inlet plenum 216 will flow into and through the bypass conduit 206, bypassing the combustor 204. As a result, the air flow into the combustor is reduced to a level that is more conducive to flame ignition and stability. At substantially the same time, the FADEC 150 will open the auxiliary engine fuel injector 218, to admit fuel into the combustor 204, and command one or more of the igniters 302 to spark, thereby igniting the fuel/air mixture.

Once the combustor 204 is ignited, the auxiliary engine 104 will become self powering, and reduced flow through the combustor 204 is no longer needed. Thus, the FADEC 150 will cause the valve 208 to move to the closed position. Compressed air is now supplied to the auxiliary engine combustor assembly 138 from the auxiliary engine compressor 136.

The auxiliary engine 104 integrates the functions of an APU with one or more functions of an ECS, and is capable of operating in both an unfired mode and a fired mode. The combustor system 138 configuration allows the auxiliary engine to be quickly and stably transitioned from the unfired mode to the fired mode.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

We claim:
1. A gas turbine engine, comprising:
 a compressor having an inlet and a compressed air outlet;
 a turbine having at least an inlet;
 a combustor system including:
  a housing having at least a first air inlet in fluid communication with the compressed air outlet, a second air inlet adapted to receive compressed air from a second compressed air source, and an inlet plenum in fluid communication with the first and second air inlets,
  a combustor mounted at least partially within the housing, the combustor having one or more air inlets in fluid communication with the housing inlet plenum, and an outlet in fluid communication with the turbine inlet,
  a bypass conduit having an inlet, an outlet, and a flow passage therebetween, the bypass conduit inlet in fluid communication with the housing inlet plenum, and the bypass conduit outlet in fluid communication with the combustor outlet, and
  a valve mounted on the bypass conduit and moveable between (i) an open position, whereby fluid flow through the bypass conduit is allowed, and (ii) a closed position, whereby fluid flow through the bypass conduit is prevented.

2. The gas turbine engine of claim 1, further comprising:
 an actuator assembly coupled to the valve, the actuator assembly adapted to receive valve position command signals and operable, in response thereto, to move the valve between the open and closed positions.

3. The gas turbine engine of claim 1, further comprising:
 a fuel injector coupled to the housing and configured to inject fuel supplied thereto into the combustor.

4. The gas turbine engine of claim 3, further comprising:
 one or more igniters coupled to the housing and extending at least partially into the combustor.

5. The gas turbine engine of claim 1, further comprising:
 a combustion air conduit coupled between the combustor outlet and the turbine inlet.

6. The gas turbine engine of claim 5, wherein the combustion air conduit is configured to be substantially spiral in shape.

7. The gas turbine engine of claim 5, wherein the bypass conduit outlet is in flow communication with the combustion air conduit.

8. The gas turbine engine of claim 1, further comprising:
 a conduit interface coupled to and surrounding the combustor, the conduit interface having an inlet and an outlet, the conduit interface inlet in fluid communication with the bypass conduit outlet, and the conduit interface outlet in fluid communication with the turbine inlet.

9. The gas turbine engine of claim 8, further comprising:
 a combustion air conduit having an inlet and an outlet, the combustion air conduit inlet coupled to, and in fluid communication with, the conduit interface outlet, and the combustion air conduit outlet coupled to, and in fluid communication with, the turbine inlet.

10. A combustor system, comprising:

a housing having at least a first air inlet, a second air inlet, and an inlet plenum in fluid communication with the first and second air inlets, the first air inlet adapted to receive compressed air from a first compressed air source, and the second air inlet adapted to receive compressed air from a second compressed air source;

a combustor mounted at least partially within the housing, the combustor having one or more inlets, and an outlet, each combustor inlet in fluid communication with the housing inlet plenum;

a bypass conduit having an inlet, an outlet, and a flow passage therebetween, the bypass conduit inlet in fluid communication with the housing inlet plenum, and the bypass conduit outlet in fluid communication with the combustor outlet; and a valve mounted on the bypass conduit and moveable between (i) an open position, whereby fluid flow through the bypass conduit is allowed, and (ii) a closed position, whereby fluid flow through the bypass conduit is prevented.

11. The combustor system of claim 10, further comprising:

an actuator mounted on the combustor assembly housing and coupled to the valve, the actuator adapted to receive valve position command signals and operable, in response thereto, to move the valve between the open and closed positions.

12. The combustor system of claim 10, further comprising:

a fuel injector coupled to the housing and having at least a fuel inlet and a fuel outlet in fluid communication with one another, the fuel inlet coupled to receive fuel from a fuel source, and the fuel outlet disposed within the combustor.

13. The combustor system of claim 12, further comprising:

one or more igniters extending into the combustor.

14. The combustor system of claim 10, further comprising:

a combustion air conduit coupled between the combustor outlet and the turbine inlet.

15. The combustor system of claim 14, wherein the combustion air conduit is configured to be substantially spiral in shape.

16. The combustor system of claim 14, wherein the bypass conduit outlet is in flow communication with the combustion air conduit.

17. The combustor system of claim 10, further comprising:

a conduit interface coupled to and surrounding the combustor, the conduit interface having an inlet and an outlet, the conduit interface inlet in fluid communication with the bypass conduit outlet, and the conduit interface outlet in fluid communication with the turbine inlet.

18. The combustor system of claim 17, further comprising:

a combustion air conduit having an inlet and an outlet, the combustion air conduit inlet coupled to, and in fluid communication with, the conduit interface outlet, and the combustion air conduit outlet coupled to, and in fluid communication with, the turbine inlet.

19. A system, comprising:

a main engine including a compressor, a combustor, and one or more turbines; and an auxiliary power unit (APU) including a compressor having an inlet and a compressed air outlet, a turbine having at least an inlet, and a combustor system, the combustor system including:

a housing having at least a first air inlet in fluid communication with the APU compressor air outlet, a second air inlet coupled to receive compressed air from the main engine compressor, and an inlet plenum in fluid communication with the first and second air inlets, a combustor mounted at least partially within the combustor system housing, the combustor having one or more air inlets in fluid communication with the housing inlet plenum, and an outlet in fluid communication with the APU turbine inlet, a bypass conduit having an inlet, an outlet, and a flow passage therebetween, the bypass conduit inlet in fluid communication with the combustor system housing inlet plenum, and the bypass conduit outlet in fluid communication with the combustor outlet, and a valve mounted on the bypass conduit and moveable between (i) an open position, whereby fluid flow through the bypass conduit is allowed, and (ii) a closed position, whereby fluid flow through the bypass conduit is prevented.

20. A method of operating a gas turbine engine having at least a combustor inside a combustor housing, the method comprising the steps of:

supplying a flow of compressed air through the combustor housing to said combustor, said combustor housing having at least two distinct air inlets, each of said air inlets connected to a distinct air supply source;

determining whether the compressed air flowing through the combustor should be ignited;

if so, bypassing a portion of the compressed air flow away from the combustor;

supplying fuel to the combustor; and igniting the fuel supplied thereto.

* * * * *